United States Patent [19]

Mettner et al.

[11] Patent Number: 5,238,223

[45] Date of Patent: Aug. 24, 1993

[54] METHOD OF MAKING A MICROVALVE

[75] Inventors: Michael Mettner, Ludwigsburg, Fed. Rep. of Germany; Martin A. Schmidt, Reading, Mass.; Theresa Lober, Newton, Mass.; Michael A. Huff, Medford, Mass.

[73] Assignees: Robert Bosch GmbH, Stuttgart, Fed. Rep. of Germany; Mass. Inst. of Tech., Cambridge, Mass.

[21] Appl. No.: 899,260

[22] Filed: Jun. 16, 1992

Related U.S. Application Data

[62] Division of Ser. No. 566,997, Aug. 13, 1990, Pat. No. 5,142,781.

[30] Foreign Application Priority Data

Aug. 11, 1989 [DE] Fed. Rep. of Germany ....... 3926647

[51] Int. Cl.$^5$ .............................................. F16K 31/02
[52] U.S. Cl. .................................. 251/368; 251/367; 251/129.06
[58] Field of Search .................... 251/367, 368, 129.06

[56] References Cited

U.S. PATENT DOCUMENTS

| | | | |
|---|---|---|---|
| 4,647,013 | 3/1987 | Giachino et al. | 251/129.06 |
| 4,756,508 | 7/1988 | Giachino et al. | 251/129.06 |
| 4,826,131 | 5/1989 | Mikkor | 251/368 |
| 4,869,282 | 9/1989 | Sittler et al. | 251/367 |
| 4,951,510 | 8/1990 | Holm-Kennedy | 73/862.04 |
| 4,984,361 | 1/1991 | Woolatt et al. | |
| 5,029,805 | 7/1991 | Albarda et al. | 251/129.06 |
| 5,065,978 | 11/1991 | Albarda et al. | 251/129.17 |

FOREIGN PATENT DOCUMENTS 0079266 5/1955 Denmark ........................... 29/890.12

OTHER PUBLICATIONS

Theresa Lober & Roger Howe, "Surface Micro-Machining Processes for Electrostatic Microactuator Fabrication," IEEE, 1988.

T. Ohnstein et al., "Micromachined Silicon Microvalve", *IEEE Proceedings on Micro Electro-Mechanical Systems*, Feb. 1990, pp. 95–98.

M. A. Huff, M. S. Mettner, T. A. Lober & M. S. Schmidt, "A Pressure-Balanced Electrostatically-Actuated Microvalve" presentation Jun. 1990, *IEEE Solid-State Sensor & Actuator Workshop.*

Shigeru Nakagawa et al., "A Micro Chemical Analyzing System Integrated On a Silicon Wafer Proceedings,", *IEEE Micro Electro Mechanical Systems*, Napa Valley, Calif., p. 89, Feb. 11–14, 1990.

S. Timoschenko, *Theory of Plates and Shells*, Chapter III, Bending of Circular Plates, pp. 55–68, McGraw-Hill, 1940.

(List continued on next page.)

*Primary Examiner*—A. Michael Chambers
*Attorney, Agent, or Firm*—Frishauf, Holtz, Goodman & Woodward

[57] ABSTRACT

A microvalve composed of multiple layers bonded together is distinguished by the fact that all layers are structured only from one side. Prior to bonding of a new layer to the preceding layer, the new layer is homogeneous or unstructured. Only after bonding of the new layer to the preceding layers or wafers is the newly-applied layer provided with a structure, by etching or other profiling method. This simplifies construction, and reduces manufacturing cost, of the microvalve. The valve can be used for either liquid or gaseous media. It is adapted for use, inter alia, as a fuel injection valve or as a pilot control stage of servo-valves used in anti-lock braking systems (ABS). A method of producing a sealed cavity with a residual gas pressure therein, which may have applications other than valve manufacture, is also disclosed.

11 Claims, 6 Drawing Sheets

OTHER PUBLICATIONS

H. Merritt, *Hydraulic Control Systems,* Chapter 3, Fluid Flow Fundamentals, pp. 39–48, John Wiley & Sons, 1967.

S. C. Terry et al., *IEEE Transactions on Electron Devices,* vol. ED-26, No. 12, pp. 1880–1886, Dec. 1979.

B. Leroy & C. Plougonven, IBM France, "Warpage of Silicon Wafers", Journal of the Electrochemical Society, *Solid-State Science & Technology,* vol. 127, No. 4, pp. 961–970, Apr. 1980.

S. Park et al., *IEEE Solid-State Sensor & Actuator Workshop,* Hilton Head, S.C., pp. 136–139, Jun. 6–9, 1988.

H. T. G. Van Lintel et al., "A Piezoelectric Micropump Based on Micromachining of Silicon", *Sensors & Actuators,* vol. 15, pp. 153–167, 1988.

M. J. Zdeblick, Ph.D. thesis, "A Planar Process For An Electric-to-Fluidic Valve", Stanford Univ., Jun. 1988.

F. Maseeh & S. Senturia, "Plastic Deformation of Highly Doped Silicon", submitted to conferences Transducers '89.

METHOD OF MAKING A MICROVALVE

This is a division of application Ser. No. 07/566,997 now U.S. Pat. 5,142,781, issued Sep. 1, 1992 filed Aug. 13, 1990.

CROSS-REFERENCE TO RELATED APPLICATION

METTNER et al. German application no. P 39 19 876, filed Jun. 19, 1989.

CROSS-REFERENCE TO RELATED LITERATURE

S. Timoschenko, *Theory of Plates and Shells*, Chapter III, Bending of Circular Plates, pages 55–68, McGraw-Hill, 1940; H. Merritt, *Hydraulic Control Systems*, Chapter 3, Fluid Flow Fundamentals, pages 39–48, John Wiley & Sons, 1967; S. C. Terry et al., *IEEE Transactions on Electron Devices*, Vol. ED-26, No. 12, pages 1880–1886, Dec. 1979; B. Leroy & C. Plougonven, IBM France, "Warpage of Silicon Wafers", Journal of the Electrochemical Society, *Solid-State Science & Technology*, Vol. 127, No. 4, pages 961–970, Apr. 1980;

S. Park et al., *IEEE Solid-State Sensor & Actuator Workshop*, Hilton Head, S.C., pages 136–139, Jun. 6–9, 1988;

H.T.G. Van Lintel et al., "A Piezoelectric Micropump "Based on Micromachining of Silicon", *Sensors & Actuators*, Vol. 15, pages 153–167, 1988;

M. J. Zdeblick, Ph.D. thesis, "A Planar Process For An Electric-to-Fluidic Valve", Stanford Univ., Jun 1988.

F. Maseeh & S. Senturia, "Plastic Deformation of Highly Doped Silicon", submitted to conference Transducers '89;

T. Ohnstein et al., "Micromachined Silicon Microvalve", *IEEE Proceedings on Micro Electro-Mechanical Systems*, Feb. 1990, pages 95–98;

M. A. Huff, M. S. Mettner, T. A. Lober & M. S. Schmidt, "A Pressure-Balanced Electrostatically-Actuated Microvalve", presentation Jun. 1990, *IEEE Solid-State Sensor & Actuator Workshop*.

The present invention relates generally to a method of making a microvalve by bonding together a plurality of thin layers and, more particularly, to an improved method according to which each layer is bonded in a homogeneous state and subsequently etched or otherwise profiled from its outer face, that is, the face opposite the face which is bonded. Alternately, one can pre-etch layers before bonding, although this generally requires additional alignment procedures.

BACKGROUND

German patent application P 39 19 876 discloses a microvalve composed of multiple layers and having a valve seat formed between layers. Due to the design of that valve, its construction requirements are high, and therefore its manufacture is costly and time-consuming.

THE INVENTION

Accordingly, it is an object of the present invention to provide a simpler and more economical method of making a microvalve. Further, it is an object to provide a sealed cavity with a residual internal pressure which can be used as a restoring force on a flexible cavity wall.

Briefly, this is accomplished placing each layer to be bonded, in an essentially unstructured or homogeneous solid state, onto the already-existing structure, bonding the layer, and then performing the etching or profiling steps on the layer. The handling of unstructured wafers or layers is simpler than the handling of already-etched wafers. Further, no special alignment is needed during bonding of the unstructured wafer to the already-existing layers. Only after the bonding step does one provide the topmost layer with a structure. It is substantially simpler to align the masks needed for further processing, with respect to the already-existing structure, than it is to align structured layers with respect to existing layers.

In a preferred embodiment of the method, the lowest wafer serves as a carrier layer for the bonding of the subsequent layers, and, prior to application of those subsequent layers, the lowest wafer is provided with a structure, namely a recess or channel, which forms a part of an actuating element. The fact that the carrier layer can take on actuating functions permits a particularly compact construction to be achieved.

According to a further feature of the inventive method, one bonds, to the carrier layer, a second wafer, and then provides a first flow channel in this second wafer. The base or floor of this channel forms a part of the cover of the recess in the carrier layer and is elastically flexible, to the extent permitted by the material. Preferably, the material is silicon, which does not have a particularly high Young's modulus. The bottom of this wafer interacts with the carrier layer in such a manner that a deflection of the bottom, with respect to the carrier layer, is possible.

In the preferred method, one bonds, to the second wafer, a third wafer, into which one again forms a channel. This channel provides a passage through to the first channel. The first channel in the second wafer is wider than the second channel in the third wafer, so that the region 19 defined by the second channel projects horizontally over the region 21 delimited by the first channel. As a result of the bonding, the region of the third layer which serves a valve plate is securely fastened to that of the second wafer.

In the preferred method, the channels in the second and third wafers are formed as ring or annular channels and the recess in the carrier layer is circular.

This geometry minimizes stress concentration and hence minimizes fatigue and the possibility of fracture.

Further embodiments of the method and their advantages will be apparent from the detailed description below.

The microvalve of the invention, made by first bonding each layer and then shaping it, is distinguished by its elegant simplicity of construction and its economical manufacture. Since the structural process is designed such that all layers are provided with structure merely from one side, the handling of the wafers which form the layers is particularly simple.

According to the preferred embodiment of the microvalve of the invention, a lowest wafer serving as a carrier layer is provided, a second wafer is bonded to it and has a projection, surrounded by a channel, which bears a valve plate which is, in turn, part of a third wafer bonded to the first wafer.

The valve plate engages a cover layer which is joined to the third wafer; the upper surface of the valve plate bears a circumferential sealing shoulder, spaced from the plate's edge, which shoulder can be brought into engagement with the underside of the cover layer. Such a sealing shoulder permits the surfaces which are under pressure to be very precisely defined, so that a precise pressure compensation and thus an optimal dynamic behavior of the valve are achievable.

Particularly preferred is a microvalve in which the height of the sealing shoulder is substantially smaller than the thickness of the valve plate. Upon manufacture of such a structure by etching methods, the dimensions of the sealing shoulder can, due to the small etching depth, be more precisely defined or controlled than would be the case upon etching of a substantially thicker valve plate.

Further advantages and structural details of the microvalve will be described below. It has been found particularly desirable for the valve plate to be coated with a hard layer. This serves to pre-tension the valve, and to reduce the wear resulting from medium streaming through the valve. Further, because the microvalve is constructed almost entirely of silicon, stresses due to thermal expansion are minimized.

The valve is preferably operated in either of two bistable modes, open mode and closed mode. If a proportional control valve is desired, the valve can be operated dynamically either on or off. Proportional control is achieved by varying the rate at which the valve is switched on and off.

DRAWINGS

The invention is further explained below with reference to the figures, of which:

DETAILED DESCRIPTION

Figure 1:
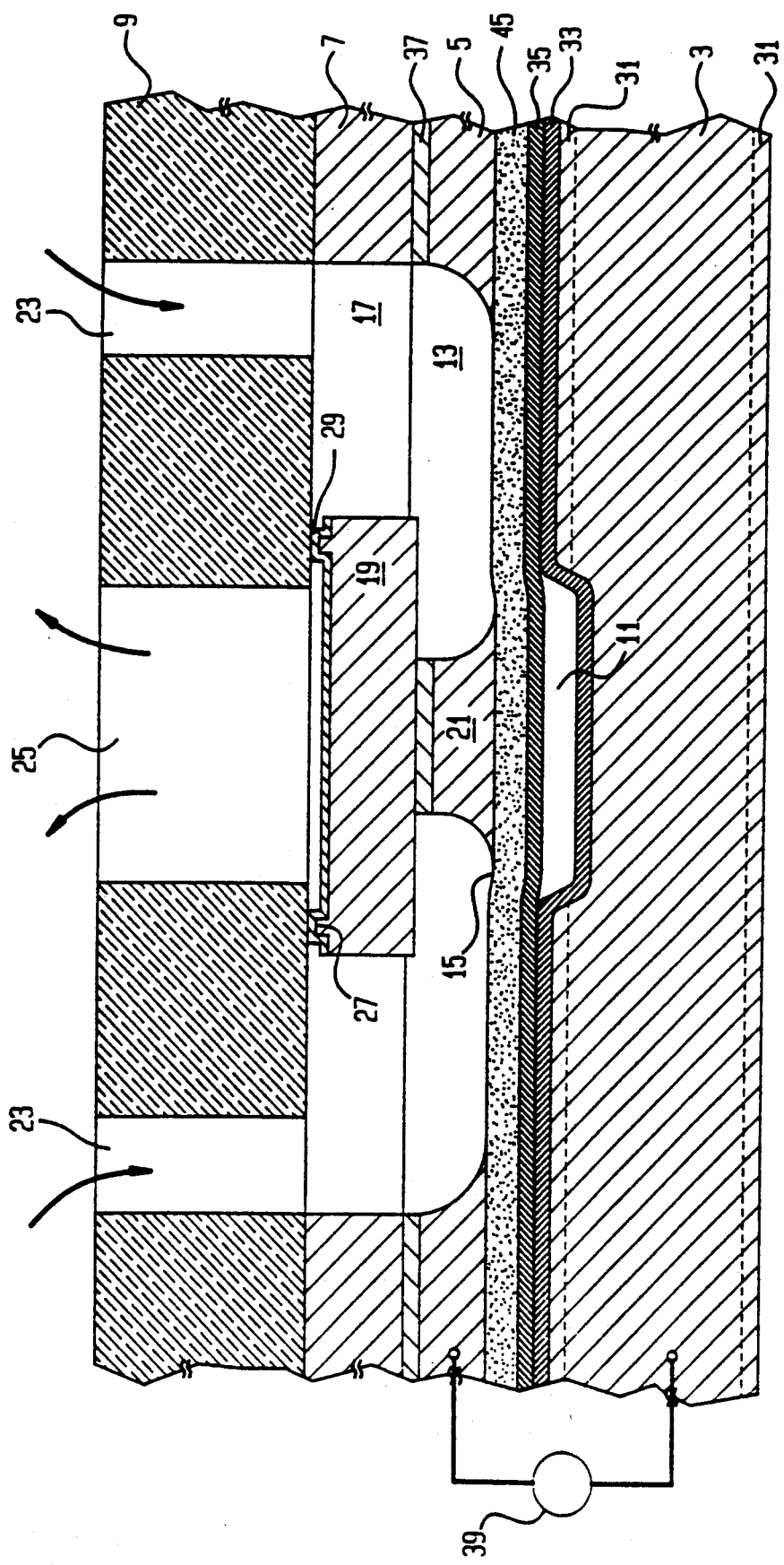
FIG. 1 is a section through the valve in its unactuated position.

The sectional view of FIG. 1 shows the arrangement of the individual layers of the valve. However, for reasons of clarity, the thickness of the individual layers is greatly exaggerated.

Microvalve 1 features a first wafer 3 which serves as the carrier layer, a second, overlying, layer 5 bonded to layer 3, and a third layer 7 bonded to second layer 5. Onto topmost layer 7, a cover layer 9 is joined by, e.g., bonding, or some other method suited to the particular material comprising the cover layer. Into lowermost layer 3, one forms a recess 11. The overlying second layer 5 is so structured that a first channel 13 is created, whose bottom 15 forms a portion of the cover of recess 11. Into the overlying third layer 7, a second channel 17 was created, whose bottom opens into the first channel 13. Second channel 17 surrounds a region which forms a valve plate 19. The valve plate is connected with a region 21 of second wafer 5 which is surrounded by first channel 13.

The dimensions of the first and second channels are so selected that valve plate 19 projects beyond the region 21 surrounded by first channel 13. This also means that the interior dimensions of second channel 17 are smaller than those of first channel 13. The outer dimensions of second channel 17 can be the same as or greater than those of first channel 13. It is apparent that recess 11 in first wafer 3 is defined by regions of floor 15 of first channel 13 and by bottom surfaces of region 21 which is surrounded by channel 13. Region 21 is substantially thicker than floor 15 of first channel 13. Floor 15 has a certain elasticity and can flex downward in the direction of recess 11, as shown in FIG. 1.

The cover layer 9, applied to third wafer 7, is provided with essentially vertical openings 23, 25, as shown in FIG. 1. These openings may be made in the cover layer after its connection to third layer 7. As shown best in FIG. 3, second opening 25 is located generally centrally with respect to the geometric features on the lower bonded wafers. Outer openings 23 open into second channel 17 in the third bonded layer 7 and thus also connect with first channel 17 in the second bonded layer 5. Outer openings 23 may comprise discontinuous breaks through layer 9. Alternatively, using appropriate packaging, it is possible to provide a continuous annular space in the cover layer, so that the space connects with both the second channel 17 and the first channel 13.

Second opening 25 in cover layer 9 is located over valve plate 19. The valve plate closes off opening 25 from second channel 17 and thus from first openings 23.

The upper surface of the valve plate features a circumferential sealing shoulder 27 which is spaced slightly inwardly from the upper circumferential corner or edge of plate 19. The height of sealing shoulder 27 is substantially less than the thickness of valve plate 19.

A hard layer 29 is applied to the upper side or surface of the valve plate and also to the upper surface of the sealing shoulder 27, which spaces the upper surface of the original sealing shoulder from the underside of cover layer 9. That is, the valve plate is deflected, in the unactuated position shown in FIG. 1, somewhat downward so that the bottom or floor 15 of first channel 13 is somewhat bowed. The hard layer 29 preferably consists essentially of silicon nitride. This hard layer 29 protects the sealing shoulder, prior to closure, against the flow of a medium which passes through the valve. The course of flow of the medium influenced by the microvalve is indicated in FIG. 1 by arrows. The medium enters through opening 23 in cover layer or plate 9 and passes into second channel 17 of third wafer 7. In the unactuated position of valve plate 19, the medium is prevented by sealing shoulder 27 from passing to and out of second opening 25.

The upper surface of first wafer 3, which serves as the carrier layer, and its undersurface, each include a doped layer 31 which serves to minimize contact resistance. The upper surface of first wafer 3, adjacent second wafer 5, may be provided with an insulating layer 33 which preferably consists essentially of silicon oxide.

The underside of second wafer 5 may also be provided with an insulating layer 35, also preferably consisting essentially of silicon oxide. Finally, such an insulating layer 37 can also be provided between second wafer 5 and third wafer 7, although this is not shown in the present preferred embodiment.

Actuation of the valve may be piezo-electric, magnetic, hydraulically, pneumatic, or some combination of these methods.

Carrier layer 3 and second wafer 5 are connected to a voltage source 39, which is preferably variable. The doping 31 in the carrier layer serves to improve contact with this voltage source.

Wafers 3 and 5, which are separated from each other by insulating layers 33 and 35, form the plates of a capacitor. Upon application of a voltage between the plates of the capacitor, the plates attract each other. Due to the elasticity of floor 15 of first channel 13, the region of second wafer 5 which covers the recess 11 in first wafer 3 is movable. Thus, whenever voltage source 39 causes the capacitor plates to attract each other, the attractive force exerted on region 21, surrounded by first channel 13, causes it to sink in the direction of the bottom of recess 11, thereby deflecting the floor 15 of first channel 13. The sinking of region 21 also moves valve plate 19 downward, so that sealing shoulder 27 is moved away from the underside of cover plate or layer 9. This opens a connection between first opening 23 through second channel 17 to second opening 25.

Whenever the voltage between the capacitor plates, i.e., wafer 3 and wafer 5, is removed, the attraction between the plates ceases, and the elasticity of floor 15 of first channel 13 moves valve plate 19 back into its original position, so that sealing shoulder 27 effects a separation between first opening 23 and second opening 25.

Figure 4:
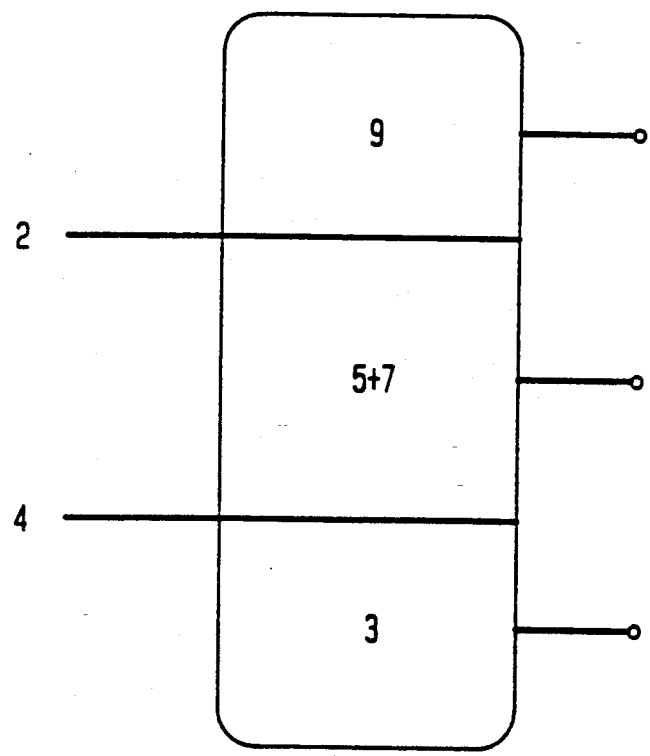
FIG. 4 is a schematic diagram of an alternate embodiment, namely a three-terminal device in which the aforementioned layers are separated by oxides.
Figure 5A:
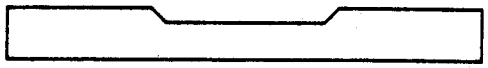
FIG. 5 is shows a valve fabrication sequence.
Figure 5B:
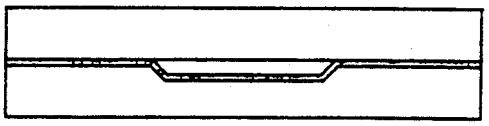
Figure 5C:
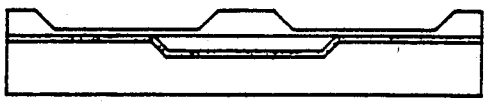
Figure 5D:
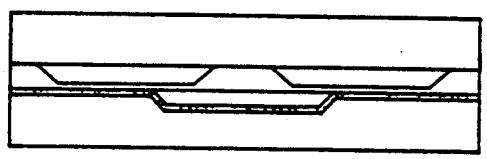
Figure 5E:
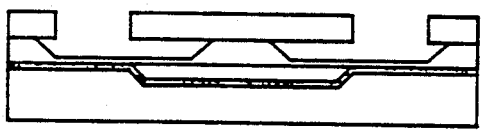
Figure 5F:
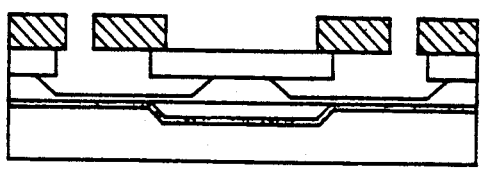
Figure 6:
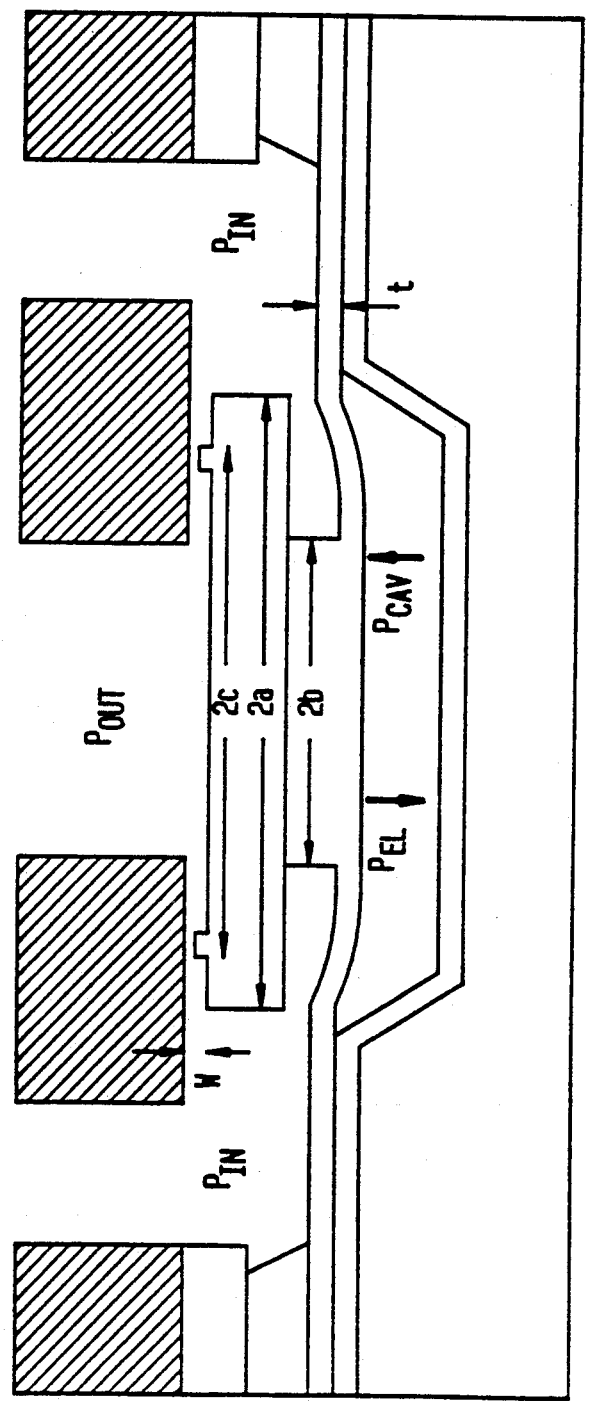
FIG. 6 illustrates valve dimensions of a preferred embodiment.

Alternately, as shown in FIG. 4, the valve can be formed as a three-terminal device in which an electrostatic voltage is applied. When voltage is applied to layer 9 and layer 5+7 across an oxide 2, the valve will close faster.

Figure 2:
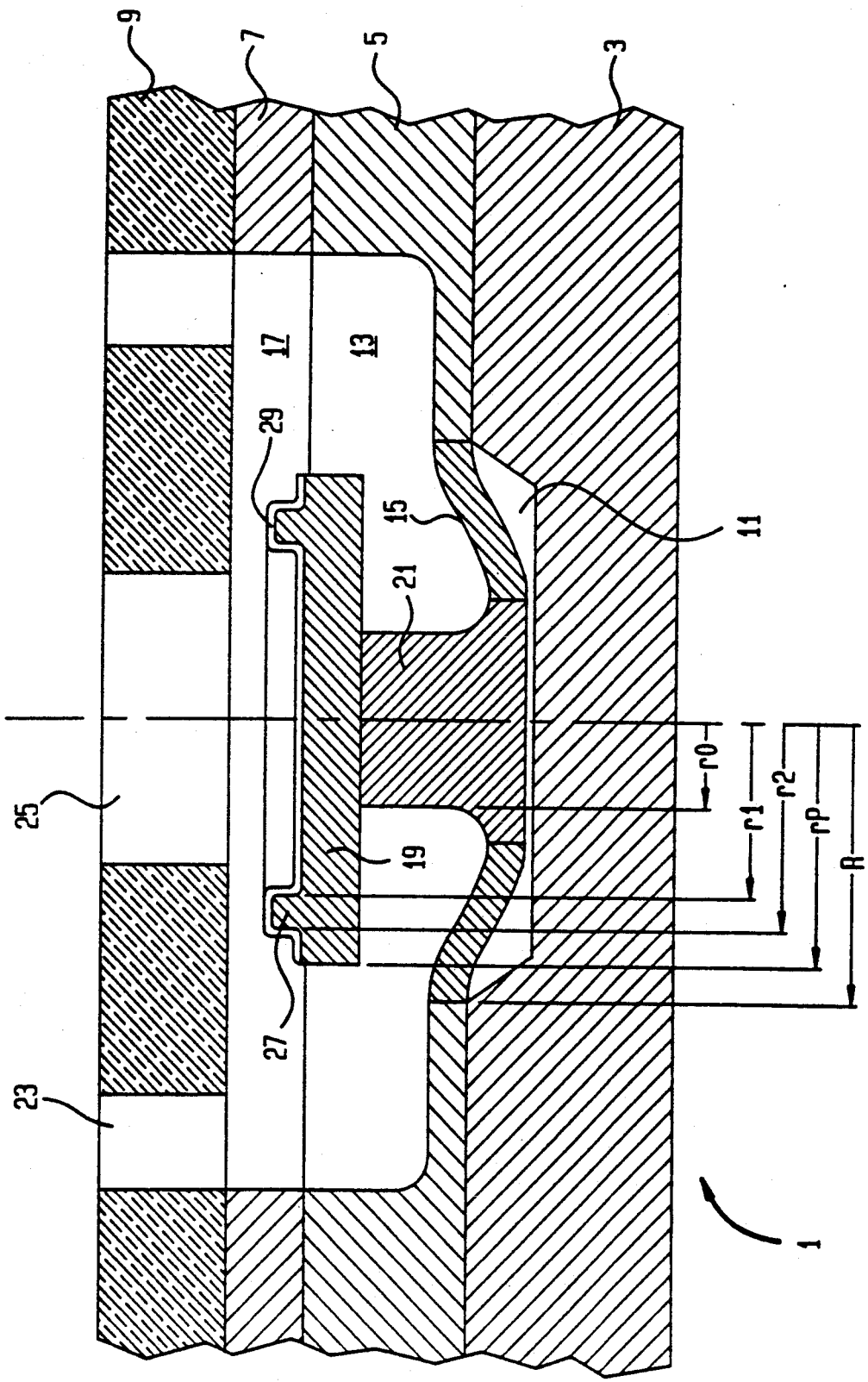
FIG. 2 is a section through the valve in its actuated position.

FIG. 2 is a section through the microvalve of FIG. 1, in more schematic form. The same elements bear the same reference numerals.

This illustration serves to again show, clearly, the deflection of the cover of recess 11 due to an applied voltage. The spacing of the base or floor of region 21 from the lower surface of recess 11 is substantially smaller than in FIG. 1. Thus, valve plate 19 is lifted off the underside of cover layer 9, and sealing shoulder 27 permits a connection between first opening 23 and second opening 25. A medium flowing into first opening 23 can go through this opening and the second channel 17 in third wafer 7 to second opening 25 and thence out through cover plate 9.

Figure 3:
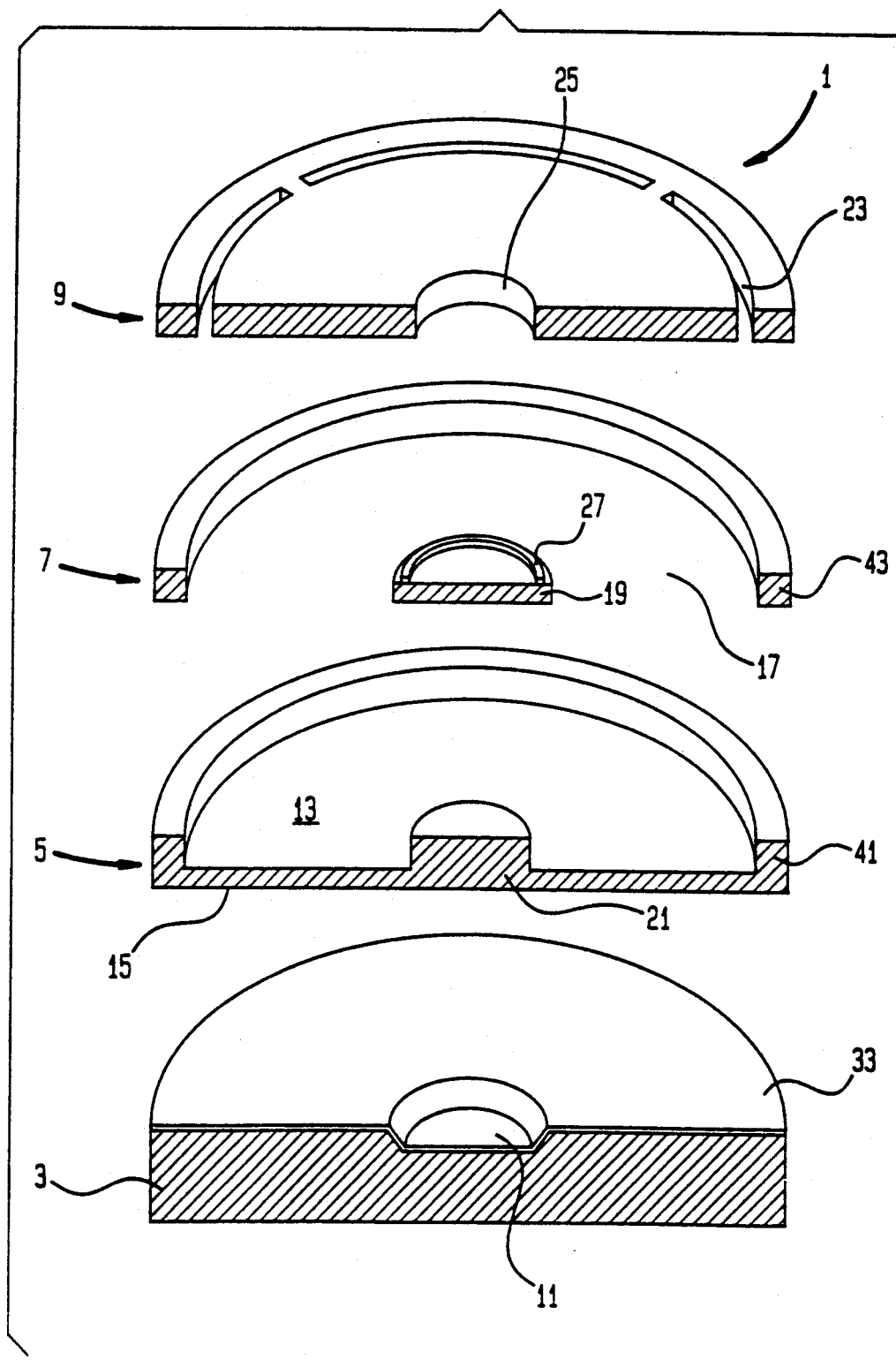
FIG. 3 is an exploded, part-sectional, perspective view of the elements of the valve of the invention.

The movement of the valve plate is shown greatly exaggerated. The stroke of the valve plate in the embodiment shown is actually about 5 micrometers long. The thickness of the carrier layer, together with the second and third layers, comes to about 0.6 mm Preferably, recess 11, first channel 13, second channel 17, sealing shoulder 27 and valve plate 19 are essentially circular. The form of second opening 25 is not critical for the functioning of the valve. It need merely be assured that the inner dimensions of this opening 25 are smaller than the inner dimensions or diameter of sealing shoulder 27, which must be able to sealingly engage the underside of cover layer 9. In the embodiment illustrated here, the diameter of the sealing shoulder is preferably about 3.6 mm and the diameter of the outermost corner edge of first opening 23 and the outer diameter of second channel 17 are respectively about 10 mm and about 10 mm. According to the illustration in FIGS. 1 and 2, the valve is part of a larger structure. However, it is also possible to make the valve separate, as shown clearly in the exploded view of FIG. 3. This FIG. 3 illustration shows once again the structure of the individual layers. The same elements are once again given the same reference numerals.

The first wafer 3, serving as carrier layer, is here formed as a substantially cylindrical plate which has at its center a circular trough or recess 11. The second wafer, which is applied in unstructured form onto the first wafer, was provided with an annular channel, so that merely an outer circumferential wall 41 and a central cylindrical region 21, defined by first channel 13, remain. A portion of floor 15 of region 21 serves to cover recess 11.

The upper side of first wafer 3 is provided with an insulating layer 33. The illustration of FIG. 3 shows that the insulating layer 33 on the underside of second wafer 5 can be omitted.

Even a single insulating layer 33 or 35 assures electrical separation of the two capacitor plates formed by first wafer 3 and second wafer 5. Also assured is that, in case of severe flexing of floor 15 of channel 13, contact between recess and surface 11 will do no harm.

After the creation of second channel 17, third wafer 7 consists of a ring 43 and the valve plate 19, defined by its surrounding channel 17.

Sealing shoulder 27 is recognizable on the upper surface of the valve plate 19. For reasons of clarity of visualization, the hard coating 29 shown in FIGS. 1 and 2 is not illustrated in FIG. 3.

Finally, atop third layer 7, cover layer 9 is provided. After processing, cover 9 features an annular channel forming first openings 23 and a circular second opening 25. It is here apparent, that the inner diameter of opening 25 is smaller than the inner diameter of sealing shoulder 27, so that the latter can make sealing engagement with the underside of cover plate 9.

From the foregoing description of the structural steps in building up microvalve 1, the simplification effected by its method of manufacturing should already be apparent:

During manufacture of the microvalve, the individual wafers are successively bonded to one another. Before bonding, the surfaces of the wafers are polished, so that a smooth surface results. Before the structuring or profiling of the surface of a layer, the surface has already been prepared and polished for bonding with the next. Surface preparation for wafers to be bonded must correspond to the particularly chosen bonding method, e.g., surface hydration is required for silicon-silicon direct bonding.

Onto each wafer, there is bonded a further wafer, which may or may not include surface structures. For example, after carrier layer 3 has had the recess 11 etched or otherwise excavated into it, another wafer, namely second wafer 5, is bonded to the carrier layer. At this point, wafer 5 is devoid of structure. Therefore, no problems of alignment of second wafer 5 with respect to first wafer 3 are presented. Projecting region 21, defined by surrounding channel 13, should be located centrally over recess 11 of first wafer 3 for optical distribution of forces. Since the channel is made only after the bonding of the second wafer, no problems are presented in aligning the layers.

Onto second wafer 5, there is bonded a continuous layer, third wafer 7. Only after this bonding is second channel 17 etched in the third wafer. It is apparent that here particular advantages are achieved, since after structuring of third wafer 3 according to FIG. 3, two elements exist: ring 43 and valve plate 19. The alignment of these two elements would have been substantially harder if the elements had been defined before layer 3 had been bonded. However, it must be realized that any of the etched features of each layer may be defined before each layer is bonded; corresponding features of each layer must then be aligned during the bonding process.

The same advantages apply to the placement of cover layer 9, which can, however, fundamentally be joined in structure form.

Cover layer 9 may be made of PYREX glass or other suitably hardened material. The connection with the underlying layer is preferably made by anodic bonding, or other suitable joining process corresponding to the cover layer's composition. This cover layer can also be made of silicon, like all the other layers, in which case the conventional means for bonding of two silicon layers can be used.

The solidity of the bonded silicon layers of the finished valve corresponds to that of a monocrystal. Thus, a high degree of mechanical stability is achieved.

Since all layers comprise the same material, namely silicon, thermal tensions cannot arise during operation of the valve. Even when using PYREX glass as cover layer 9, practically no thermal stresses or tensions arise, since the thermal characteristics of this material are very close to those of silicon.

All of the structure described here can be created in the layers with the help of conventional etching methods.

In making the covering of recess 11 in first wafer 3 in the form of floor 15 of channel 13 in second wafer 5, the thickness of the floor can be adjusted by appropriate selection of etching time. It is also possible to provide the material of second wafer 5 with a layer 45, e.g. a highly doped layer (see FIG. 1), which provides etch selectivity between the material of layer 5 and the materials in region 45 during the process of etching channel 13 in layer 5. If selective etching layer 45 is included, the etching process for creating channel 13 ends when this layer is reached. Thus one can tailor the thickness of the floor of the channel, the flexing characteristics, and the mechanical characteristics of the valve. This can be also accomplished using electro-chemical etch-stop techniques.

While second channel 17 in third wafer 7 is being etched, not only the depth of the channel, but also its width, is altered. While the etchant is eating away at the depth, the sidewalls of the channel are also being attacked. Therefore, the dimensions of the outer corner edge of valve plate 19 are not precisely defined. For this reason, one provides on the upper surface of the valve plate, preferably in a separate operation, the sealing shoulder 27, by etching the circular region within the sealing shoulder and the annular region surrounding it. The horizontal dimension of the sealing shoulder can be very precisely adjusted, since here the etching depth corresponds to the height of sealing shoulder 27. The dimensions of the sealing shoulder are thus much more precisely specifiable than those of the outer corners, the outer dimensions, of valve plate 19.

The radius of the sealing shoulder is particularly important if one wants to achieve pressure equalization at the valve plate. That is, one should, to the extent possible, ensure that the forces operating on valve plate 19 from above correspond to those operating on it from below.

When the valve is closed, a pressure builds up, from the medium entering first opening 23, in the annular space formed around the valve plate and under the valve plate by first channel 13 and second channel 17. The pressure is exerted essentially on the region of floor 15 of first channel 13, which floor is simultaneously the cover of recess 11.

FIG. 2 illustrates the fact that this annular region of floor 15 is defined approximately between the outer radius r0 of region 21, surrounded by channel 13, and the outer radius R of recess 11. This pressure coming through opening 23 seeks to deflect this annular region of floor 15 downward, i.e. to displace the valve plate off of cover plate 9. Simultaneously, this pressure coming through opening 23 exerts an upward pressure on a surface defined between the outer radius r2 of sealing shoulder 27 and the outer radius r0 of region or post 21 on which valve plate 19 rests. This annular undersurface of valve plate 19 circumscribed by radii r0 and r2 serves as a pressure compensation surface for the annular surface, of floor 15 of first channel 13, defined by radii r0 and R.

The annular surface of floor 15 and the annular surface of valve plate 19 are so dimensioned with respect to each other that the pressure forces are essentially balanced or compensated.

The thickness of annular sealing shoulder 27 is defined by the difference between radii r1 and r2 shown in FIG. 2. The outer radius of valve plate 1 9 is designated rP in FIG. 2.

The pressure balance is also affected, on one hand, by backpressure in second opening 25 and, on the other hand, by the pressure prevailing in recess 11. The backpressure is exerted on the surface of valve plate 19 enclosed by sealing shoulder 27. Here the inner radius r1 of the sealing shoulder is controlling. The pressure exerted from below on the valve plate is specified by the radius R of recess 11.

For the most precise possible balance of the pressure from below on valve plate 19, it is important that the radius R of recess 11 is, due to its shallow depth, settable very precisely.

The selection of the various radii shown in FIG. 2 not only make possible pressure balance, but also permit adjustment of the mechanical and dynamic characteristics of the valve.

OPERATION

The embodiment thus far shown and described is actuated by providing, under valve plate 19, an elastic region of floor 15 of first channel 13 which is a portion of a capacitor plate. Fundamentally, it would also be possible to provide, on the opposite side of the valve plate 19, i.e. the top side, a further actuating means via a mechanical coupling. With two-sided actuation of the valve plate, it could be moved back and forth between two stable positions.

Instead of the capacitor, another actuation means could be provided. For example, it would be possible to use an overpressure in recess 11 to move the valve plate upward from an unactuated open position into the closed position. The overpressure could, for example, be generated by heating a medium enclosed in recess 11, or by other pneumatic forces.

The embodiment illustrated here is distinguished by the fact that the feeding of the controlled medium is done via first opening 23, which is arranged on the same side of the microvalve as the outlet opening 25. It is, however, also possible to feed in the medium through a channel in third wafer 7, a channel in second wafer 5, or an aperture in first wafer 3.

The valve described here can be used for either liquid or gaseous media. It is adapted for use, inter alia, as a fuel injection valve or as a pilot control stage of servovalves.

Although in the etching of deep structures, the edge regions tend also to be eaten away, so that the dimensions of the edge or wall regions are difficult to exactly predetermine, the structure of the valve plate of the present invention assures that the hydraulically effective surfaces, and thus the forces exerted on the movable valve, can be controlled and compensated. In particular, this is achieved by making the height of sealing shoulder 27 substantially lower than the thickness of valve plate 19, so that when the sealing shoulder is etched cut, its radii can be precisely predetermined. The fact that these radii can be kept within narrow tolerances means that the valve can control even high operating pressures, which otherwise would lead to uncontrollably large forces. In this manner, even high hydraulic pressures can be influenced with the valve of the present invention.

EXAMPLE

The process for implementing the valve concept uses three water bonding steps and does not yet have a sealing ring. The fabrication sequence (FIG. 5) of the valve begins with a first wafer, which may be either n-type or p-type. For illustration purposes, let us say it is an n-type <100> 0.5-2.0 ohm-cm 4-inch silicon wafer. The wafer is placed in a phosphorus diffusion furnace at 925° C. for one and a half hours to highly dope the surface. This step is done to ensure that good electrical contact can be made, in order to actuate the valve. After a one-hour drive-in at 950° C., the wafer is stripped of the phosphorus-doped glass and a 1000 Angstrom-thick thermal oxide is grown. After the masking oxide is patterned, the wafer is placed in 20% KOH (a potassium hydroxide solution) at 56° C. for approximately 22 minutes, thereby etching circular recessed electrodes or cavities 5 micrometers deep and 3.6 mm in diameter. Alternately, the wet etchant used may be a different anisotropic etchant, an isotropic etchant, or, in some applications, the cavity can be etched by a plasma (hot gas). The masking oxide is then stripped and a thermal oxide, about 1.6 micrometers thick, is grown on the wafer. This thick layer of silicon dioxide acts as the dielectric isolation during electrostatic actuation and will also serve to protect the handle wafer from the subsequent silicon etching steps.

The second wafer may be a silicon wafer of either n-type or p-type if chemical or mechanical means are employed for thinning, but if electrochemical means are used for the etch-back, a p-type wafer with an n-type diffusion is preferred. If the first wafer discussed above is n-type, a second 4-inch diameter silicon wafer, <100> p-type 10-20 ohm-cm, is thermally bonded to the front side of the first wafer. Prior to bonding, the two wafers are cleaned using a standard pre-oxidation clean (such as an "RCA" clean ) and then hydrated by immersion into a 3:1 sulfuric acid:hydrogen peroxide solution. The wafers are rinsed in DI (de-ionized) water until the water resistivity reaches at least 10 Mohm-cm. After a spin rise and dry, the polished surfaces of the wafers are physically placed into intimate contact. Using an infrared inspection system, the wafers are examined for voids. Assuming the bond is void-free, the composite two-wafer structure is placed into a dry oxidation furnace for one hour to complete the bond. The initial furnace temperature is preferably 600° C., and is slowly ramped up to 1000° C. Pure nitrogen flows within the tube during this step. After 1000° C. is reached, the gas is changed to pure oxygen and the wafers are annealed for one hour in this gas and at this temperature. The structure is then removed from the furnace and the bonded wafers are inspected again, using the infrared inspection system.

The bonded wafers are then placed in a 20% KOH solution at 56° C. for approximately 23.5 hours and the second wafer is etched back to a resulting thickness of about 75 micrometers. The surface of the etched-back wafer is then mechanically polished to a mirror-smooth finish. The resulting thickness of the second silicon wafer is about 50 micrometers. A masking oxide (LTO) about 5000 Angstroms thick is deposited onto the just-polished surface and subsequently patterned. The wafer is then etched using a 20% KOH solution at 56° C. for approximately one and a half hours, forming the base of the valve.

After the masking oxide is stripped, a third 4-inch-diameter <100> silicon wafer, p-type 10-20 ohm-cm, is thermally bonded to the polished surface of the second wafer. The bonding is done in exactly the same way as described above. After bonding, the composite structure is inspected using the infrared inspection system. Such inspection will clearly show the plunger base bonded to the third wafer.

The third wafer is etched back in a 20% KOH solution at 56° C. to a resultant thickness of about 75 micrometers. An oxide layer, 5000 Angstroms thick, is deposited onto the third wafer surface using either LTO or an ACVD oxide. Subsequently, the wafer is patterned and etched in a 20% KOH solution at 56° C., forming the top layer and releasing the valve. The complete wafer is sawed into individual valves, which are then packaged, using a capping glass plate which contains inlet and outlet ports.

We have successfully fabricated the valve with the sealing ring. We have found that, if two wafers are bonded together where one wafer has a cavity etched into it, and the second wafer is thinned back to a relatively thin layer, and finally, the composite structure is exposed to a high-temperature environment, the silicon will plastically deform. This is the result of the trapped gases within the cavity expanding, due to increased temperature and the considerably lower yield point for the silicon at higher temperatures. We have found that the threshold of the onset of plastic deformation of silicon is between 800° and 850° C. Therefore, any material used as a masking material must be deposited or grown at a lower temperature than 800° C. We used a low-temperature chemical-vapor-deposited oxide for masking the second wafer and an atmospheric chemical vapor deposited oxide for masking the third wafer. Each of these films was deposited at a temperature of 400° C.

The complete microvalve prototype, without sealing ring, was successfully actuated in air with voltages below 350 volts.

The foregoing method has also been found useful in production of sealed cavities with residual gas pressure.

Residual Pressure in Sealed Cavities

The bonding of a silicon wafer with cavities to another silicon wafer results in trapped gases within the sealed cavity. It was of interest to determine the residual pressure of this trapped gas in order to model the behavior of the valve. Starting with p-type <100> silicon wafers, we diffused phosphorous into the wafers to act as an electrochemical etch stop. These wafers where then bonded to other silicon wafers which had circular cavities of various depths ranging from 30 to 50 micrometers. After selectively removing the oxide from the backside of the phosphorous doped wafers, the wafers were then etched in KOH in order to thin the wafers to a resultant thickness of 50 micrometers. The wafers then were electrochemically etched in KOH, resulting in a smooth, 8.0 ± 0.2 micrometer-thick capping layer of silicon over the sealed cavity. The thickness of this layer was verified using an SEM (Scanning Electron Microscope). After etching, it is immediately noticed that the capping layer is deflected into the cavity, indicating that the residual pressure is below atmospheric. The deflections of the capping layer of silicon were measured with a calibrated microscope. Using the theory of large deflection of circular plates we can write an expression relating the maximum deflection of the circular plate to the pressure differential across the plate as:

$$w = 0.662\, a^3\, (qa/Et)^{\frac{1}{3}}$$

where E is Young's modulus of silicon, a is the radius of the circular cavity, t is the thickness of the capping layer. In this equation it is assumed that the residual stress in the silicon layer is negligible.

The differential pressure across the plate is a function of the deflection of the capping layer into the cavity and is given by:

$$Q = P_{ATM} - (P_1 V_1 / V_1 - \text{delta } V)$$

where $P_{ATM}$ is atmospheric pressure $P_I$ and $V_I$ are the initial pressure and initial volume of the cavity, respectively, and $\Delta V$ or delta V is the change in cavity volume. The deflection of the capping layer is assumed to have a spherical mode shape. Calculated values of the residual pressure inside the cavities measured are given in Table I where it is seen the average residual pressure is 0.79 atmosphere, due to oxygen-silicon reactions with normal 21%-oxygen room air, leaving only the 79% relatively inert nitrogen inside the cavity.

TABLE 1

| | RESIDUAL PRESSURE INSIDE SEALED CAVITIES | | |
|---|---|---|---|
| WAFER # | AVERAGE DEPTH OF CAVITY | AVERAGE DEFLECTION OF CAPPING LAYER | RESIDUAL PRESSURE INSIDE CAVITY (ATM) |
| 1 | 53 | 20.1 | .778 |
| 2 | 53 | 19.5 | .787 |
| 3 | 32 | 12.8 | .795 |
| 4 | 31 | 13.1 | .782 |

By adjusting the concentration of the oxygen, one could get a different residual pressure, e.g. 50%/50% $O_2/N_2$ results in 0.5 atm. This residual pressure can be used to provide a restoring force on a flexible element in a microvalve or accelerometer or similar device.

Plastic Deformation of Lightly Doped Silicon

High temperature thermal processing of a bonded wafer with a sealed cavity results in the expansion of the trapped gas causing the capping layer to be loaded beyond the yield point. After removing the wafer from the furnace and allowing it to cool, it is observed that a residual strain is present in the capping layer, as is clearly seen in the SEM (Scanning Electron Microscope) view in FIG. 7 of our Jun. 1990 IEEE presentation. The occurrence of plastic deformation of lightly doped silicon and heavily doped silicon has been reported elsewhere. It was of interest to determine the onset temperature of plastic deformation in lightly doped silicon. Therefore, we prepared bonded wafer samples with cavities and placed the wafers in a furnace at various temperatures. Starting at 600° C. the wafers were annealed in nitrogen for one hour and then removed. The change in deflection of the capping layer of the cavity was then observed using a calibrated microscope. The wafers were placed back in the furnace, this time with a temperature of 650° C. and removed after one hour and remeasured. This sequence continued, incrementally increasing the temperature each time by 50° C. until 1000° C. was reached. We found the onset of plastic deformation to be between 800-850° C. It has been reported that the onset of plastic deformation is highly dependent on the amount of oxygen precipitates within the silicon and therefore the onset temperature we observed may vary considerably depending on the wafers and process.

As a result of this experiment, it was concluded that high temperature processing of the device wafers must be avoided whenever a sealed cavity exists inside the bonded wafers. Consequently, the masking oxide used to pattern bonded silicon layer 2 and layer 3 was a low-temperature deposited oxide. It is also noted that the bonding of layer 3 to the composite structure of layer 1 and layer 2 requires a high temperature anneal. However, in this case the pressure balancing of the valve helps to prevent the valve from being permanently deformed.

We claim:

1. Microvalve having a plurality of layers bonded together, including
    a first wafer (3) which serves as a carrier layer;
    a second wafer (5) bonded to said first wafer and formed with a central projection (21) defined by a surrounding first channel (13);
    a third wafer (7) bonded to said second wafer (5) and including a valve plate (19) secured to said projection (21);
    and a cover layer (9) bonded to said third wafer (7) and including an undersurface adapted to engage said valve plate (19);
    and wherein each layer (3, 5, 7, 9) has apertures (11, 13, 17, 23, 25) formed therein from only one side thereof.

2. Microvalve according to claim 1, further comprising
    a sealing shoulder (27) formed on an upper surface of said valve plate (19), spaced from a circumferential edge thereof, and adapted to engage said undersurface of said cover layer (9).

3. Microvalve according to claim 2, wherein said sealing shoulder (27) has a height which is substantially less than a thickness of said valve plate (19).

4. Microvalve according to claim 1, wherein a surface of said valve plate (19) adjacent said undersurface of said cover layer (9) is coated with a hard layer (29).

5. Microvalve according to claim 4, wherein said hard layer consists essentially of silicon nitride.

6. Microvalve according to claim 1, wherein
said cover layer (9) consists essentially of PYREX glass and all other layers (3, 5, 7) consist essentially of silicon.

7. Microvalve according to claim 1, wherein all of said layers (3, 5, 7, 9) consist essentially of silicon.

8. Microvalve according to claim 1, wherein
an insulating layer (33, 35) is provided on at least one of:
a surface of said first layer (3) adjacent said second layer (5) and
a surface of said second layer (5) adjacent said first layer (3).

9. Microvalve according to claim 1, wherein
an insulating layer (33, 35) is provided on at least one of:
a surface of said second layer (5) adjacent said third layer (7) and
a surface of said third layer (7) adjacent said second layer (5).

10. Microvalve according to claim 1, wherein at least one major surface of said first wafer (3) includes a doped layer (31).

11. Microvalve according to claim 1, wherein
an undersurface of said second wafer (5) includes a doped layer (45).

* * * * *